United States Patent Office 3,536,646
Patented Oct. 27, 1970

3,536,646
METHOD FOR POLYMER DILUTION
Asa Elliott Hatch and Earl G. Harrell, Lake Jackson, Tex., assignors to The Dow Chemical Company, Midland, Mich., a corporation of Delaware
No Drawing. Filed Mar. 13, 1967, Ser. No. 622,416
Int. Cl. C08g *51/24, 53/18;* C08j *1/46*
U.S. Cl. 260—29.2                          10 Claims

ABSTRACT OF THE DISCLOSURE

The instant invention concerns an improved method for diluting aqueous sols of polyalkylene polyamines in the preparation of application solutions of the polymer for flocculation purposes. The sol is mixed with the dilution water under shearing agitation which rapidly disperses and further solvates the polymers. Surprisingly, the polymers thus dispersed have improved flocculation efficiencies as compared to polymers which are dissolved under non-shearing conditions.

---

Among various polymeric compositions employed in flocculation processes are the cationic polyalkylene polyamines, which are normally prepared and sold in the form of relatively concentrated aqueous solutions or sols. Because they are concentrated, they are also viscous. Before they can be used efficiently for flocculation purposes, these sols must be diluted to provide non-viscous polymer applicating solutions.

It is a principal object of the present invention to provide an improved method for the preparation of applicating solutions of polyalkylene polyamines available in the form of aqueous sols. Particularly, it is an object to provide a rapid method for achieving dilution of such polymers. A further object is the enhancement of their flocculation potential. These objects, and other benefits as will become apparent hereinafter, are achieved in the following invention.

In accordance with the instant invention, aqueous sols of polyalkylene polyamines are diluted with water under shearing agitation to prepare desired applicating solutions. The polyalkylene polyamine sols so diluted will usually contain from about 5 up to as much as 60 percent, or so, by weight polymer solids. Generally, the sols will contain at least about 20 percent by weight dissolved polymer solids.

The desired improved solvation and flocculation activity of the diluted polymer is obtained in practice by mixing the sol with at least about 1 up to as much as 150 volumes of dilution water, per volume of polymer sol, under shearing agitation. Preferably, from about 10 to about 100 volumes of dilution water are employed to prepare the polymer solution. This initial solution can be used as is for the applicating solution, or it may be readily further diluted as desired to provide a given concentration utilizing conventional low-shear liquid mixing devices. Usually there is a concentration for the given polymer dispersed, which yields optimum flocculation. Most applicating solutions will contain from about 0.05 to 2 percent by weight polymer solids.

The necessary shearing agitation can be defined in terms of the rate of energy input per unit volume of the mixture of the aqueous polyalkylene polyamine sol and water of dilution. For effective results, this energy input should be at least about 25,000 foot pounds per minute per gallon of mixture and preferably at least about 40,000 foot pounds per minute per gallon of mixture. Such agitation is applied to the mixture for a period of time sufficient to uniformly disperse the polymer sol. Once it is uniformly dispersed, excessive additional shearing agitation may be harmful. Preferably, the shearing agitation is limited to less than about 5 minutes.

The required shearing agitation may be produced in several ways, the choice of which can be simply a matter of convenience and availability of equipment so long as the particular equipment used can supply the aforementioned energy input.

For instance, such energy input can be achieved as by recycling the polymer and dilution-water mixture through a centrifugal pump, subjecting the system to high speed shearing agitation as may be provided by a Waring blender or an equivalent high speed mixer. Effectually any device with high speed rotating vanes, impellers or turbines can be used for the shearing mixer. Rotational speeds can vary but the tip or peripheral speed of the vane, impeller or turbine should be at least about 30,000 inches per minute. In addition to rotational mixing devices, suitable shearing can be accomplished by forcing a mixture of polymer sol and dilution water through an orifice or by subjecting such mixture to turbulent flow conditions in a pipe. By way of comparison, stirring, shaking and other low speed mixers conventionally used for the purpose of preparing polymer dispersions are unsatisfactory.

It is to be noted that the use of shearing agitation is entirely inconsistent with currently recommended practices for preparing diluted polymer solutions. Recommended practices specifically counsel against the use of shearing agitation to avoid degradation of the polymer and thus loss of polymer efficiency as a flocculant. Unexpectedly, however, the polyalkylene polyamine sols described herein perform more efficiently as flocculants when the sol has been dispersed in dilution water under shearing agitation.

"Polyalkylene polyamine" as used herein, includes polymerized alkylenimines, as illustrated in U.S. 3,203,910, condensation products of alkyl dihalides and polyamines, as described in U.S. 3,210,308 and 3,219,578, condensation products of ammonia and epichlorohydrin, as described in U.S. 3,174,928 and in general any water-soluble polymeric composition in which there is a recurring alkylene amine moiety. Other methods for the preparation of these polymers include the condensation of ammonia and ethylenedichloride, addition polymerization of alkylenimines initiated by any of a wide variety of catalysts, reaction of polyalkylene polyamines such as diethylenetriamine, triethylenetetramine and higher polyamines with polyfunctional materials reactive therewith such as the alkyl dihalides, epichlorohydrin, formaldehyde and the like.

To prepare the high molecular weight products, useful as flocculants, the above polymerization reactions are usually conducted in the presence of a reaction medium such as water. The polymer product is thus obtained in the form of an aqueous sol. Since it is difficult to recover activity retaining polymer solids from such sols, the polymers are normally utilized in sol form.

The foregoing method for dispersing polymer sols is illustrated in the following examples. The first two examples show the improved activity of the sheared polymer applicating solution on organic waste solids. The third example illustrates dosage savings possible in the treatment of inorganic solids suspended in river water, when the polymer is sheared and diluted in accordance with the invention.

EXAMPLE 1

An activated sludge produced by the biological oxidation of a waste stream was conditioned for dewatering by treatment with a polyalkylene polyamine aqueous sol. Two aliquots of the sludge were treated with different polymer applicating solutions prepared in accordance with the instant invention. The polymer sol had been prepared by the condensation of polyalkylene polyamine with ethylenedichloride in water. The procedure was similar to that described in U.S. Pat. 3,210,308. The resulting viscous sol contained about 37 percent dissolved polymer solids.

Applicating solution (A) was prepared by dispersing 5 grams of the polymer sol in 495 grams of water with a blender operated at 15,000 r.p.m. for one minute. A uniform dispersion was visually apparent. A second uniform applicating solution (B) was prepared from like proportion of the polymer sol and dilution water by recycling the mixture through a centrifugal pump for 1.5 minutes. The centrifugal pump was operated at 5000 r.p.m.

For the purposes of comparison, applicating solutions of the polymer were also prepared in the conventional manner from like proportions of the ingredients utilizing a magnetic stirrer (applicating solution D) and another utilizing a propeller stirrer (applicating solution C) as the means of agitation. The polymer and dilution water were thus stirred for a period of two hours to achieve a visually uniform solution of the polymer.

The activated sewage sludge, which contained about 4 percent by weight solids on a dry basis, was conditioned for dewatering using the applicating solutions prepared above according to conventional flocculation techniques. Upon filtration in a standard Büchner funnel, the cake moisture was determined. A series of runs was made with each applicating solution to establish the dose required to produce a filter cake with about 20% dry solids. As indicated in the following table, the minimum quantity of polymer necessary to obtain such a filter cake decreases appreciably with the polyalkylene polyamine applicating solutions prepared with shearing agitation.

TABLE I

| Application solution | Agitating means | Energy input [1], ft. lbs. | Polymer dose [2] lbs. | Percent of control, D, percent |
|---|---|---|---|---|
| (A) | Blender | 46,100 | 16.5 | 80 |
| (B) | Centrifugal pump | 40,000 | 17.0 | 82 |
| (C) | Propeller stirrer | 19,300 | 19.8 | 96 |
| (D) | Magnetic stirrer | 3,060 | 20.6 | Control |

[1] Energy input equals foot-pounds per minute per gallon of mixture of polymer sol and dilution water.
[2] The minimum amount of polymer, per ton of treated sludge solids, required to produce a filter cake of 20% dry solids.

EXAMPLE 2

Aliquots of a sewage stream, contained in a 500 milliliter graduated cylinder, were treated with sufficient amounts of application solution (A) of Example 1 to provide doses in two separate settling experiments of 12 and 16 pounds of polymer per ton of dry solids, respectively. For the purposes of comparison applicating solution (D) of Example 1 was applied in like quantities to further aliquots of the sewage.

The time for the flocculated solids to settle from the 450 milliliter to the 300 milliliter division mark on the graduated cylinder is the settling time indicated below.

TABLE II

| Application solution | Dose, lbs./T | Settling time, seconds |
|---|---|---|
| A (blender) | 12 | 285 |
| Do | 16 | 210 |
| D (magnetic stirrer) | 12 | 345 |
| Do | 16 | 275 |

The above data clearly indicates a significant improvement in the settling time as the result of preparing the polymer applicating solution under conditions of high shear as contrasted with the polymer applicating solution prepared in a manner designed to avoid shear degradation of the polymer.

Aliquots of turbid river water were dosed with applicating solutions of an aqueous sol of a polyalkylene polyamine as described in Example 1. In each flocculation operation, 500 millimeters of the river water were placed in a one liter beaker equipped with flocculation inducing agitating means. The flocculation operation was begun by stirring the river water with a Phipps and Bird stirrer arrangement at 100 r.p.m. Under these conditions, a given dose of polyalkylene polyamine applicating solution was applied to the river water and the stirring continued for one minute to complete initial mixing of the polymer with the suspension to be flocculated. Thereafter the stirring was slowed to 40 r.p.m. for 15 minutes to induce solids coagulation. The stirring was then ceased and quiescent settling permitted for 20 minutes. A sample of the supernatant fluid was removed and its turbidity measured photometrically.

By a series of operations conducted in the foregoing manner, the dose required to reduce the supernatant turbidity to four parts per million turbidity units for each of the applicating solutions was determined. This polymer dose for each applicating solution is set forth in the following table.

TABLE III

| Applicating solution | Agitating means | Dose, p.p.m. | Percent of control, D, percent |
|---|---|---|---|
| (A) | Blender | 1.25 | 78 |
| (B) | Centrifugal pump | 1.30 | 81 |
| (C) | Propeller stirrer | 1.50 | 94 |
| (D) | Magnetic stirrer | 1.60 | Control |

What is claimed is:

1. A method for the dilution of aqueous sols of water-soluble high-molecular-weight polyalkylene polyamines of the flocculant grade produced by employing shearing during the manufacture thereof, which comprises mixing said polyalkylene polyamine aqueous sol with at least an equal volume of water under shearing agitation characterized in that the mixture is subjected to at least 25,000 foot pounds per minute per gallon of mixture for a period sufficient to disperse the aqueous sol uniformly whereby the fluocculation activity of the resulting applicating solution of the polymer is enhanced.

2. A method as in claim 1 wherein polyalkylene polyamine aqueous sol is characterized as containing from about 5 up to about 60 percent by weight polymer solids.

3. A method as in claim 2 wherein the shearing agitation is applied to the mixture for less than about 5 minutes.

4. A method as in claim 1 wherein the amount of dilution water is from about 10 up to about 150 volumes per volume of polyalkylene polyamine aqueous sol.

5. A method as in claim 3 wherein the polyalkylene polyamine aqueous sol contains at least about 20 percent by weight polymer solids.

6. A method as in claim 1 wherein the mixture is subjected to at least 40,000 foot pounds per minute per gallon of mixture.

7. A method as in claim 1 wherein the shearing agitation is provided by passing the aqueous sol and dilution water through a rotational shearing mechanism operated at a peripheral speed of at least 30,000 inches per minute.

8. A method as in claim 7 wherein the rotational shearing mechanism is a centrifugal pump.

9. In a method of flocculating an aqueous suspension of suspended solids with a water-soluble high-molecular-weight polyalkylene polyamine polymer of flocculant grade provided in the form of an aqueous sol with 5 to 60 weight percent polymer solids produced by employing shearing during the manufacture thereof, which method comprises applying to said suspension an aqueous applicating solution of said polymer, the improvement which consists in preparing the applicating solution of the polymer by mixing the polyalkylene polyamine aqueous sol with at least an equal volume of water under shearing agitation characterized in that the mixture is subjected to at least 25,000 foot pounds per minute per gallon of mixture for a period sufficient to disperse the aqueous sol uniformly.

10. A method as in claim 9 wherein the shearing agitation is applied to the mixture of sol and water for less than about 5 minutes.

References Cited

UNITED STATES PATENTS

| | | | |
|---|---|---|---|
| 2,982,751 | 5/1961 | Anthes | 260—29.2 |
| 3,210,308 | 10/1965 | Garms et al. | 260—29.2 |
| 3,248,353 | 4/1966 | Coscia | 260—29.2 |

JOHN C. BLEUTGE, Primary Examiner

U.S. Cl. X.R.

209—5; 210—23; 252—327; 260—2, 34.2